Aug. 12, 1947.  G. A. ZURAVSKY  2,425,587
FISHHOOK
Filed Jan. 15, 1946
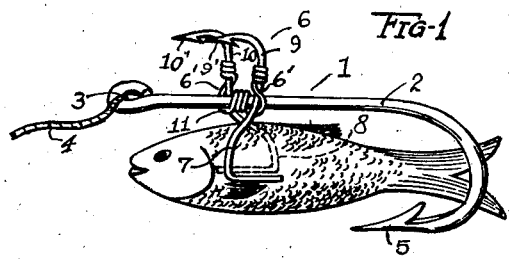
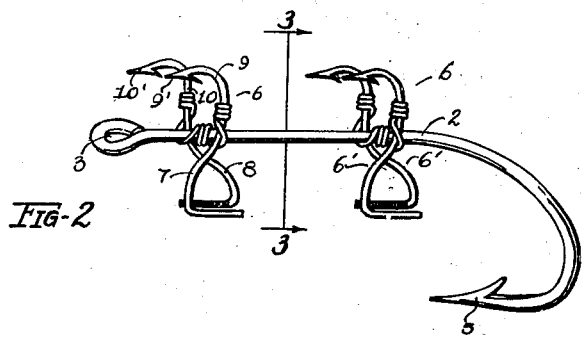
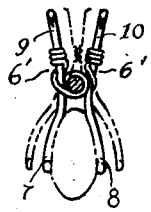 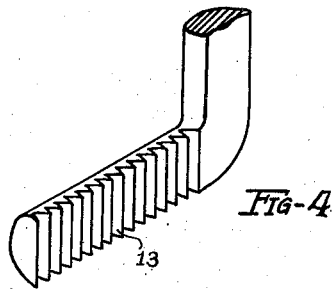
INVENTOR
Gerasim A. Zuravsky
BY Frank M. Slough
HIS ATTORNEY Patented Aug. 12, 1947

2,425,587

UNITED STATES PATENT OFFICE 2,425,587

FISHHOOK

Gerasim A. Zuravsky, Cleveland, Ohio

Application January 15, 1946, Serial No. 641,226

1 Claim. (Cl. 43—40)

My invention relates to a fish hook and relates further to improved means for attaching live bait thereto.

An object of my invention is to provide improved means associated with a fish hook whereby live bait may be securely retained by said hook without injury to the bait whereby the said bait may maintain a restricted lively movement in use which will be attractive to fish.

Another object of my invention is to provide improved means associated with a fish hook adapted to hold live bait in close association with the hook and adapted for use with various size and type of bait.

Another object of my invention is to provide improved means associated with a fish hook adapted to hold live bait in close association with the hook and adapted for use with various size and type of bait.

Another object of my invention is to provide improved means associated with a fish hook adapted to so securely hold live bait in association with said hook that it will not be accidentally disengaged therefrom during casting of the line, etc. and unnecessary rebaiting will be eliminated.

Another object of my invention is to provide improved means associated with a fish hook which will act as a support to aid in ejecting large fish from said hook.

Another object of my invention is to provide improved means associated with a fish hook which will provide stop portions when small fish are caught to keep said fish from swallowing the greater portion of the fish hook.

Still a further object of my invention is to provide improved means for associating live bait with a fish hook which will be efficient in use and economical in manufacture.

Other objects of my invention and the invention itself will become more readily apparent from the accompanying drawings and following description and claim.

In the drawings:

Fig. 1 is a side elevational view of the improved device of my invention showing a live minnow in securely retained position therein, an opposite side of the device being illustrated in dotted lines;

Fig. 2 is a perspective view of the improved device of my invention but showing my invention in another modification thereof;

Fig. 3 is a view taken from the line 3—3 of Fig. 2; and

Fig. 4 is a greatly enlarged view of a portion of the improved device of my invention.

This application is a continuation in part of my copending application for Letters Patent, Serial No. 536,151, filed May 18, 1944.

Referring to the drawings illustrating my invention in a preferred embodiment thereof, in all of which drawings like parts are designated by like reference characters, at 1 I show a conventional type fish hook having a shank 2, an eyelet 3 to which the lead line 4 is adapted to be secured, and a barbed end 5 at the opposite curved end.

To the shank 2 of the hook 1, I have secured a spring clamp device, generally designated at 6, said clamp being formed of light weight spring wire or the like material and comprising a pair of clamp members 6'—6', each having downwardly extending, medially bowed jaws 7 and 8, said jaws, when said clamp members are assembled, being disposed in oppositely disposed directions, each of said jaw ends being serrated for purposes hereinafter recited. Said clamp members further comprise a pair of integrally formed manually operable portions 9 and 10 respectively and barbed end portions 9' and 10' facing the same direction, when said clamp members are assembled.

In both forms of my invention illustrated in Figs. 1 to 4 inclusive, the jaws 7 and 8 are integrally formed with the portions 9 and 10, and 9' and 10' respectively in each separate clamp member and a portion of a coil spring 11 is telescoped about the shank 2 and secured at opposite ends thereof to each pair of manually operable upwardly extending portions 9 and 10 of the clamp members to secure the said clamp members to the shank 2 of the fish hook and the ends of said spring 11 are preferably soldered or welded thereto.

It will be noted, as stated, that the portions 9 and 10 terminate in hook portions 9' and 10' and are preferably barbed to act as a support, aiding in the ejection of large fish from the hook 1. Also, when any small fish are caught, the hook portions 9' and 10' act as stops to keep said fish from swallowing the greater portion of the fish hook 1 which would make dislodgment of the fish from the hook most difficult and cause injury therefor to such smaller fish when it is necessary to throw such catch back in the water in accordance with the laws' requirements.

Additionally, it should be noted that, when the jaws 7 and 8 are in operative or converging relation to each other, as shown in Fig. 3, that the portions 9 and 10 are spaced a considerable distance apart, and that, when the portions 9 and 10 of the clamp members are manually brought closer together, the jaws 7 and 8 are caused to spring apart, as shown in Fig. 3, thereby relieving pressure upon the bait and releasing the same.

In operation, this device of my invention, is adapted to securely clamp the sides of a live minnow, frog or the like, as shown in Fig. 1, within the clamping jaws 7 and 8, as shown therein, sufficient spring pressure being exerted upon the sides of said bait to retain the same within the spring clamp device and in close association with the hook without injury to the bait. To aid in the securing of said bait, the sides of the jaw members 7 and 8 are indentured, as best shown in Fig. 4 at 13, and the jaws facing opposite directions and thus indentured do not permit accidental dislodgment of the bait. It will be obvious that a small live frog may be secured, in like manner to that illustrated in Fig. 1 for a live minnow between the securing prongs 7 and 8 of Figs. 1, 2 and 3.

It can thus be seen that the bait is unaffected in certain of its movements, that wriggling is permitted and that it will attract fish by virtue of such movement but cannot accidentally become dislodged from the bait's association with the said hook.

In ordinary practice, the impaling of bait upon a hook either sufficiently injures the bait or kills it so that its lively action is impaired and therefore, it does not attract fish, or the bait is easily withdrawn from the hook and lost therefrom.

In the form of my invention, shown in Fig. 2, a pair of spring clamp devices are utilized upon the relatively larger hook shown and it is to be understood that the same involves no departure from the essential spirit of my invention but is merely a modification thereof, which may be preferred.

Although I have described therefor my invention in certain preferred embodiments, I am aware that numerous and extensive departures may be made therefrom, without, however, departing from the spirit of my invention and the scope of the appended claim.

I claim:

In a device of the character described, a spring clamp secured to the shank of a fish hook, said shank comprising manually operated and bait securing members, the bait securing members of said clamp being positioned between said shank and the barbed extremity of the hook and adapted to partially embrace a live bait and to exert spring pressure thereon upon operation of said manually operated members, said manually operated members each having a barbed end portion extending from the opposite side of said fish hook and in the same direction as said barbed end of said fish hook.

GERASIM A. ZURAVSKY.

REFERENCES CITED

The following references are of record in the file of this patent:

UNITED STATES PATENTS

| Number | Name | Date |
|---|---|---|
| 600,241 | Walker | Mar. 8, 1898 |
| 1,730,957 | Valiga | Oct. 8, 1929 |

FOREIGN PATENTS

| Number | Country | Date |
|---|---|---|
| 8,409 | Great Britain | Nov. 5, 1908 |
| 367,701 | Great Britain | Feb. 25, 1932 |
| 802,205 | France | Aug. 31, 1936 |